United States Patent Office
3,103,972
Patented Sept. 17, 1963

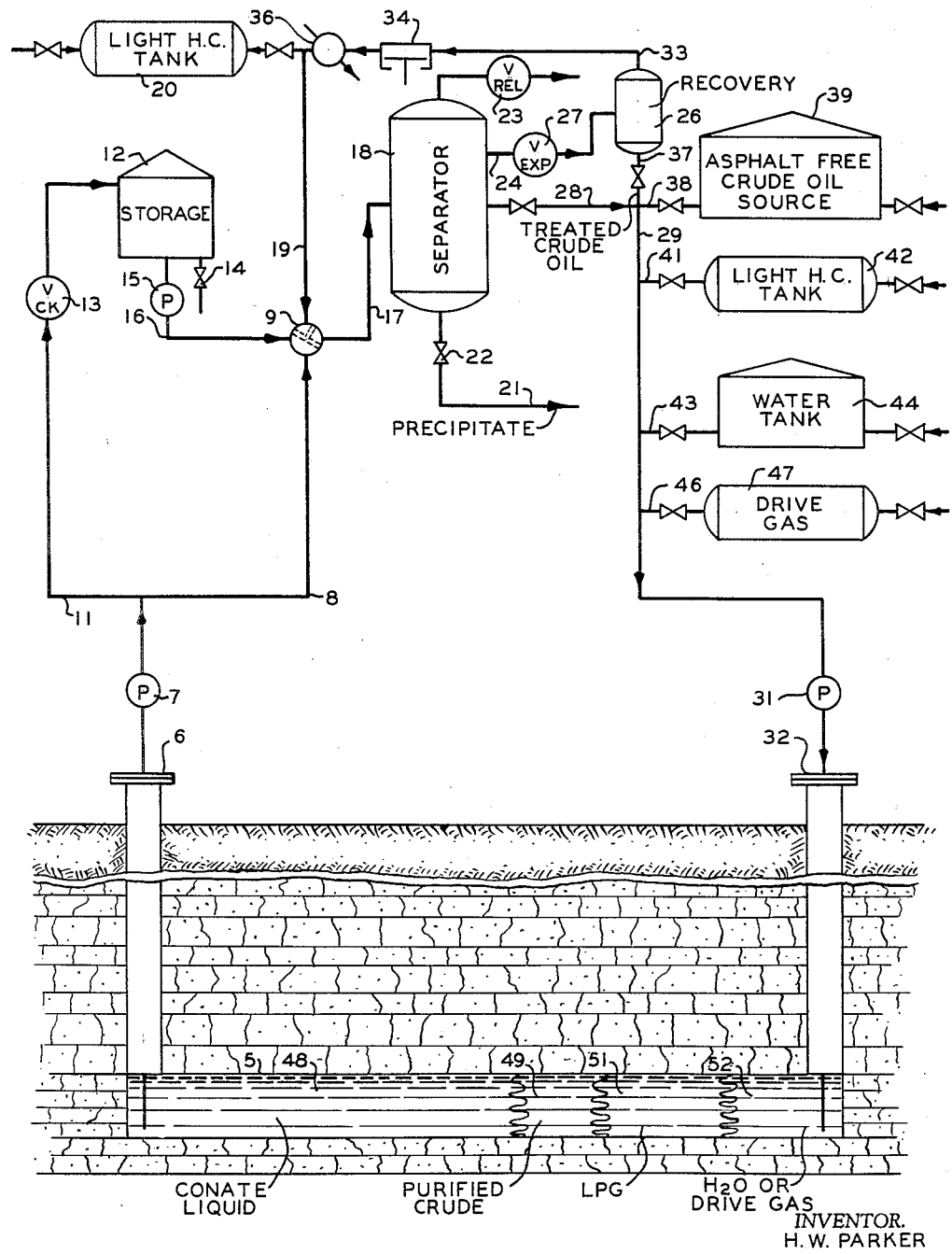

1

3,103,972
MISCIBLE-FLUID FLOODING TECHNIQUE
Harry W. Parker, Bartlesville, Okla., assignor to Phillips Petroleum Company, a corporation of Delaware
Filed Dec. 28, 1959, Ser. No. 862,387
13 Claims. (Cl. 166—9)

This invention relates to an improved method of miscible-fluid flooding in which a crude oil slug is prepared for injection into a well by washing the crude oil with L.P.G. to remove precipitate-forming materials before the slug is injected into the formation. In another aspect it relates to contacting asphaltic crude oil with L.P.G. to precipitate and remove those materials that would tend to collect at the oil-L.P.G. interface in a formation undergoing miscible-fluid flooding. In yet another aspect it relates to an oil-treating system for economically precipitating and separating asphaltic constituents from a crude oil which is to be used as a slug between formation oil and L.P.G. injected as a driving fluid. In still another aspect it relates to employing an asphalt-free crude oil as a slug between formation oil and L.P.G.

During the course of initial production from an oil formation, the reservoir pressure eventually drops to a point such that it is no longer possible to displace oil at an economical rate by natural means. It has then become the practice in oil production to employ one or more means of secondary recovery. One of these methods is the miscible-fluid flood technique, wherein L.P.G., or the like, is injected into one or more wells for a period of time, this is usually followed by gas injection for a longer period, in order to provide an artificial driving force to displace oil from the formation toward adjacent producing wells. One difficulty with this secondary recovery technique concerns the interaction in the oil formation of L.P.G. with many crude oils, which contain numerous constituents that form an insoluble precipitate when mixed in a volume ratio of about 10:1 L.P.G. to crude oil ratio. This particular volume ratio has yielded precipitate material amounting to about 13 weight percent of the crude oil. It is believed that this amount of precipitate is large enough to make possible the partial or total plugging of the formation during the injection of L.P.G. In fact, data indicates that the precipitation of asphaltic materials may have been the principal cause of failure of one field miscible-fluid displacement trial.

I have devised an economical method of employing, as well as preparing, if necessary, a substantially asphalt-free crude oil slug to be used as a barrier between asphalt-containing crude oil in formation and injected L.P.G., whereby plugging by asphaltic precipitates will be substantially prevented and sweep efficiency improved.

It is an object of this invention to provide for improved secondary recovery of hydrocarbons from underground reservoirs where the miscible-fluid flood system is used.

It is among the objects to provide an improved method of miscible-fluid flooding wherein precipitate plugging of the formation will be substantially prevented.

It is another object to provide an economical means of employing or preparing a crude oil slug, substantially free from precipitate-forming materials, which will be injected into an oil formation between the formation oil and L.P.G., whereby plugging of small pores of the formation will be generally prevented.

It is still another object to provide an apparatus for economically separating the asphaltic constituents in crude oil which precipitate upon mixing with L.P.G.

Further objects and advantages of this invention will become apparent to those skilled in the art from a study of the accompanying disclosure, drawing and appended claims.

Referring now to the diagrammatic elevational view,

2 showing one embodiment of the crude oil treating system of this invention, in which crude oil is produced from an oil bearing formation 5 via producing wells 6. A pump 7 conducts produced oil either thru conduit 8 to a 3-way valve 9, or via conduit 11 to a crude oil storage tank 12. Line 11 is also provided with a check valve 13. A valve 14 is provided in the bottom of tank 12 for draining and cleaning as needed. Pumping means 15 are provided on outlet conduit 16 for withdrawing stored crude oil from tank 12 and pumping it via valve 9 into a mixing conduit 17. Conduit 17 enters a separation vessel 18, intermediate the ends thereof.

Three-way valve 9 is designed to operate so as to permit simultaneous flow therethrough of produced crude oil from conduit 8 and lighter hydrocarbons from conduit 19 into mixing conduit 17, or simultaneous flow into conduit 17 of stored crude oil from lines 16 and light hydrocarbons from line 19. Conduit 19 is further provided with a makeup tank 20 for supplying lighter hydrocarbons to the mixing zone 17, as needed. Either method of making up the mixed hydrocarbon feed to vessel 18 is satisfactory, and will depend entirely upon whether well 6 is producing oil at the time a supply of untreated oil is required for preparing a treated crude oil slug, or if storage tank 12 is full.

Separation vessel 18, preferably of the gravity separation type, although a centrifugal or filter type may be employed instead, is designed to separate the oil-insoluble precipitates which form in mixing conduit 17 from the mixed hydrocarbon stream. Vessel 18 may also be maintained at a pressure and temperature similar to that of the conditions in the formation in order to simulate the precipitate-forming conditions that will be found there. Conduit 21, in the bottom of vessel 18, is provided with a valve 22 for periodically withdrawing collected precipitate and passing it to disposal. Vessel 18 is also provided with a pressure release valve 23, in the upper portion thereof, for permitting the escape of very light, gaseous hydrocarbons, such as methane and ethane, as needed. Vessel 18 is also provided with a conduit 24 for conducting substantially precipitate-free mixed hydrocarbon from vessel 18 to a recovery vessel 26. Conduit 24 is provided with an expansion valve 27 for reducing the fluid pressure of the mixed hydrocarbon stream as it passes into vessel 26. Vessel 18 is provided with another conduit 28 for passing the mixed hydrocarbons, e.g., L.P.G.-diluted crude oil, directly to well injection conduit 29. Conduit 29 is provided with pumping means 31 for injection into well 32 of oil formation 5.

Recovery vessel 26 is provided with an overhead conduit 33 for passing flashed light hydrocarbons to a compressor 34, where they are reliquefied, then are passed on through cooling means 36 in conduit 33, and finally to light hydrocarbons feed line 19. Vessel 26 has another conduit 37 in the lower portion thereof, for conducting the residual treated crude oil to well injection conduit 29.

Injection conduit 29 is provided with an inlet conduit 38 from an asphalt-free crude oil storage source, such as tank 39. Conduit 29 is also provided with an inlet conduit 41 from a light hydrocarbons storage source, such as vessel 42. Conduit 29 is further provided with an inlet conduit 43 from a well water storage source, such as tank 44. Finally, line 29 is also provided with an inlet 46 from a driving gas storage vessel 47.

In operation, crude oil from producing well 6 or storage tank 12 combines with lighter hydrocarbons from conduit 19 through 3-way valve 9. The streams are intimately mixed in conduit 17 before entering separation vessel 18. The precipitates which form on mixing, being insoluble in the mixed hydrocarbon phase, settle in the bottom of separation vessel 18, and are withdrawn therefrom through conduit 21. The mixed hydrocarbons remaining in separation vessel 18 may be passed directly through conduit 28 to well injection conduit 29. Preferably, to minimize the costs of lighter hydrocarbons required in this treatment, the mixed hydrocarbon stream, is passed through expansion valve 27 on conduit 24 to recovery vessel 26. The lighter hydrocarbons, such as propane, butane, L.P.G., or natural gasoline, are flashed overhead and passed through conduit 33 to compressor 34. After being reliquefied and cooled, they pass into hydrocarbon feed and recycle line 19. Treated crude oil, substantially free of lighter hydrocarbons, passes out the bottom of recovery vessel 26, through line 37, to well injection conduit 29, and then into injection well 32. After sufficient crude oil has been injected into oil formation 5 so as to form a complete barrier between crude oil in formation and later injected lighter hydrocarbons, the injection of treated crude oil is terminated. This is followed by injection of lighter hydrocarbons, such as L.P.G., for the conventional period. Finally, a drive fluid, such as water or methane gas or other inert gas such as carbon dioxide, air, nitrogen, combustion gases, or mixtures of the same, is injected into well 32 behind the L.P.G. Thus, several distinct zones are formed in the oil-bearing formation, ranging from conate liquid 48 adjacent producing well 6 through treated crude at 49, L.P.G. at 51, and driving gas at 52, adjacent the injection well.

Alternatively, the entire crude oil treating step can be avoided if an asphalt-free crude oil source is available. In this case, inlet conduit 38 from asphalt-free crude oil storage tank 39 enters conduit 29 of injection well 32. After sufficient asphalt-free crude oil has been injected into the formation to form a complete barrier as before, the injection of the other driving solvents and gases follows.

Since the precipitate-forming materials have been removed from the injected crude oil slug or were not present in the first place, the injected lighter hydrocarbons will displace oil in formation with greater efficiency, than by directly contacting them with an asphaltic crude oil in the formation. Plugging of the formation is substantially prevented.

Well water varies from well to well and usually contains dissolved minerals, such as sodium chloride, in minor amounts. However, as long as experience shows that the mineral content of the water to be used is insufficient to cause plugging of the oil-bearing formation, well water is useful in the practice of the present invention as a driving fluid.

A batch method of preparing a slug of treated crude oil may also be employed. This would comprise contacting the crude oil with a lighter hydrocarbon in a tank. Next stratifying the admixture to form an insoluble precipitate phase, and a treated crude oil phase substantially free of said precipitate. Finally, decanting the treated crude oil phase from the precipitate phase yielding the product to be injected into the formation.

Various modifications and alterations of this invention will become apparent to those skilled in the art without departing from the spirit and scope of the invention, and it should be understood the latter is not necessarily limited to the aforementioned discussion and accompanying drawing.

I claim:

1. In a method of recovering hydrocarbons from a hydrocarbon-bearing formation having at least one injection well and at least one producing well, the steps of injecting into the formation through the injection well a crude oil slug which is substantially free of materials that form asphaltic precipitates upon contacting lighter hydrocarbons selected from the group consisting essentially of hydrocarbons with a carbon chain length of three and four carbon atoms and natural gasoline, injecting said lighter hydrocarbons into said formation behind said oil slug, said crude oil being injected in an amount sufficient to form a complete barrier between said hydrocarbons in formation and said lighter hydrocarbons, and producing the hydrocarbons in said formation from said at least one producing well.

2. The method according to claim 1 wherein said lighter hydrocarbon is liquefied petroleum gas.

3. The method according to claim 1 wherein said lighter hydrocarbon is propane.

4. The method according to claim 1 wherein said lighter hydrocarbon is butane.

5. The method according to claim 1 wherein said lighter hydrocarbon is natural gasoline.

6. In a method of recovering hydrocarbons which form insoluble asphaltic materials upon contacting lighter hydrocarbons from a hydrocarbon-bearing formation having at least one injection well and at least one producing well, comprising the steps of producing some of the hydrocarbons from said formation, contacting the same with said lighter hydrocarbon selected from the group consisting of lighter hydrocarbons with a carbon chain length of three and four carbon atoms and natural gasoline, thereby forming a substantial part of the hydrocarbon-insoluble materials in the resulting mixed hydrocarbon phase, separating said mixed hydrocarbons from said insoluble materials in a separation zone, injecting a slug of the treated mixed hydrocarbons into said formation prior to the injection of said lighter hydrocarbons, and injecting said lighter hydrocarbon into said formation behind said treated mixed hydrocarbons.

7. In a method of recovering hydrocarbons which form insoluble asphaltic materials upon contacting lighter hydrocarbons from a hydrocarbon-bearing formation having at least one injection well and at least one producing well, comprising the steps of producing some of the formation hydrocarbons from said formation, contacting said formation hydrocarbons with said lighter hydrocarbon selected from the group consisting of the ligher hydrocarbons with a carbon chain length of three and four carbon atoms and natural gasoline, thereby forming a substantial part of the hydrocarbon-insoluble materials in the resulting mixed hydrocarbon phase, separating said mixed hydrocarbons from said insoluble materials in a separation zone, recovering said lighter hydrocarbons from said mixed hydrocarbons in a recovery zone, recycling said lighter hydrocarbons to contacting with untreated crude oil, injecting a slug of the treated formation hydrocarbons into said formation prior to the injection of said lighter hydrocarbons, and injecting said lighter hydrocarbons into said formation behind said treated formation hydrocarbons.

8. In a method of recovering hydrocarbons which form insoluble asphaltic materials upon contacting lighter hydrocarbons from a hydrocarbon-bearing formation having at least one injection well and at least one producing well, comprising the steps of producing some of the formation hydrocarbons from said formation, contacting said formation hydrocarbons with said lighter hydrocarbon selected from the group consisting of lighter hydrocarbons with a carbon chain length of three and four carbon atoms and natural gasoline, thereby forming a substantial part of hydrocarbon-insoluble materials in the resulting mixed hydrocarbon phase, separating said mixed hydrocarbons from said insoluble materials in a separation zone, injecting a slug of said treated mixed hydrocarbons into said formation prior to the injection of said lighter hydrocarbons, and injecting said lighter hydrocarbons into said formation behind said treated mixed hydrocarbons, whereby said injected lighter hydrocarbons displace said formation hydrocarbon in said formation with greater efficiency and plugging of said formation is substantially prevented.

9. The method of claim 1 in which the lighter hydrocarbon is followed by a drive fluid selected from the group consisting of water, methane gas, carbon dioxide, air, nitrogen, and combustion gases.

10. The method of claim 6 in which the lighter hydrocarbon is followed by a drive fluid selected from the group consisting of water, methane gas, carbon dioxide, air, nitrogen, and combustion gases.

11. The method of claim 7 in which the lighter hydrocarbon is followed by a drive fluid selected from the group consisting of water, methane gas, carbon dioxide, air, nitrogen, and combustion gases.

12. The method of claim 8 in which the lighter hydrocarbon is followed by a drive fluid selected from the group consisting of water, methane gas, carbon dioxide, air, nitrogen, and combustion gases.

13. The method of claim 1 in which sufficient lighter hydrocarbons are injected to form a complete barrier between said crude oil slug free of precipitate-forming materials and later-injected drive fluid, and drive fluid is then injected.

References Cited in the file of this patent

UNITED STATES PATENTS

| | | |
|---|---|---|
| 2,700,637 | Knox | Jan. 25, 1955 |
| 2,713,906 | Allen | July 26, 1955 |
| 2,853,427 | Bentley et al. | Sept. 23, 1958 |
| 2,867,277 | Weinaug et al. | Jan. 6, 1959 |
| 2,878,874 | Allen | Mar. 24, 1959 |
| 2,900,308 | Matyear | Aug. 18, 1959 |
| 2,927,637 | Draper | Mar. 8, 1960 |
| 2,953,501 | Mignone | Sept. 20, 1960 |